June 20, 1939. E. K. BENEDEK 2,163,079
HYDRAULIC TRANSMISSION
Filed May 18, 1935 6 Sheets-Sheet 1

June 20, 1939.   E. K. BENEDEK   2,163,079
HYDRAULIC TRANSMISSION
Filed May 18, 1935

Inventor
ELEK K BENEDEK

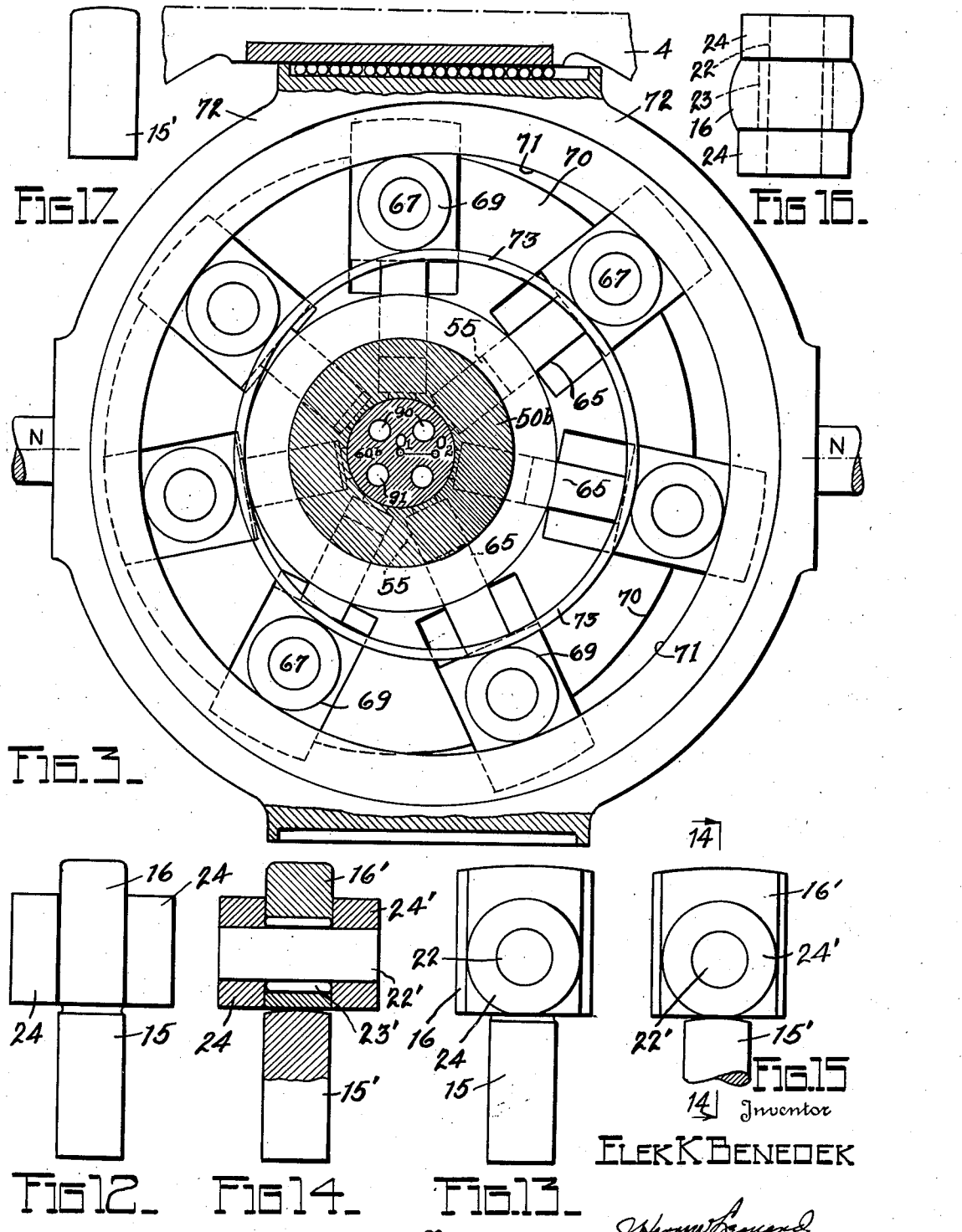

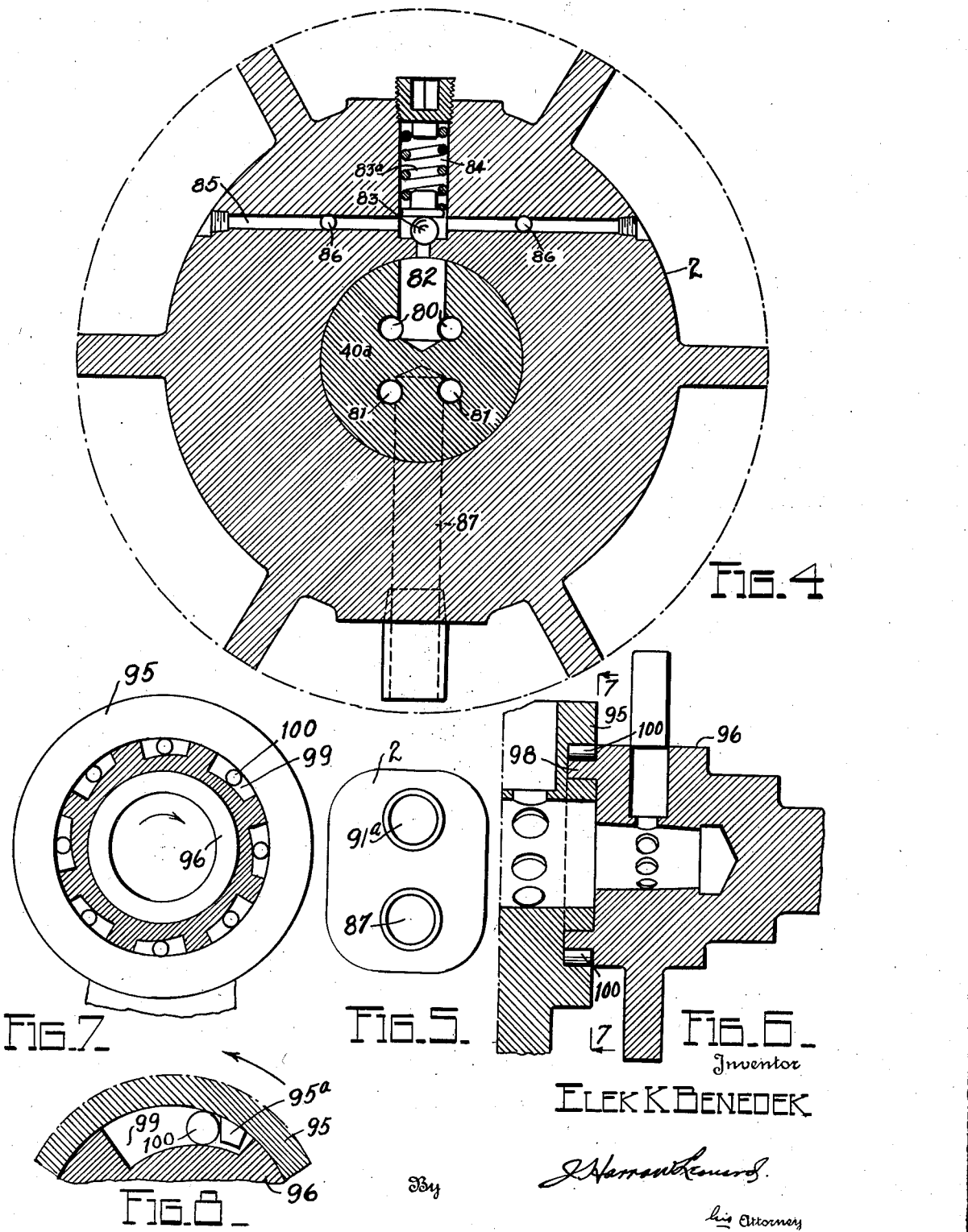

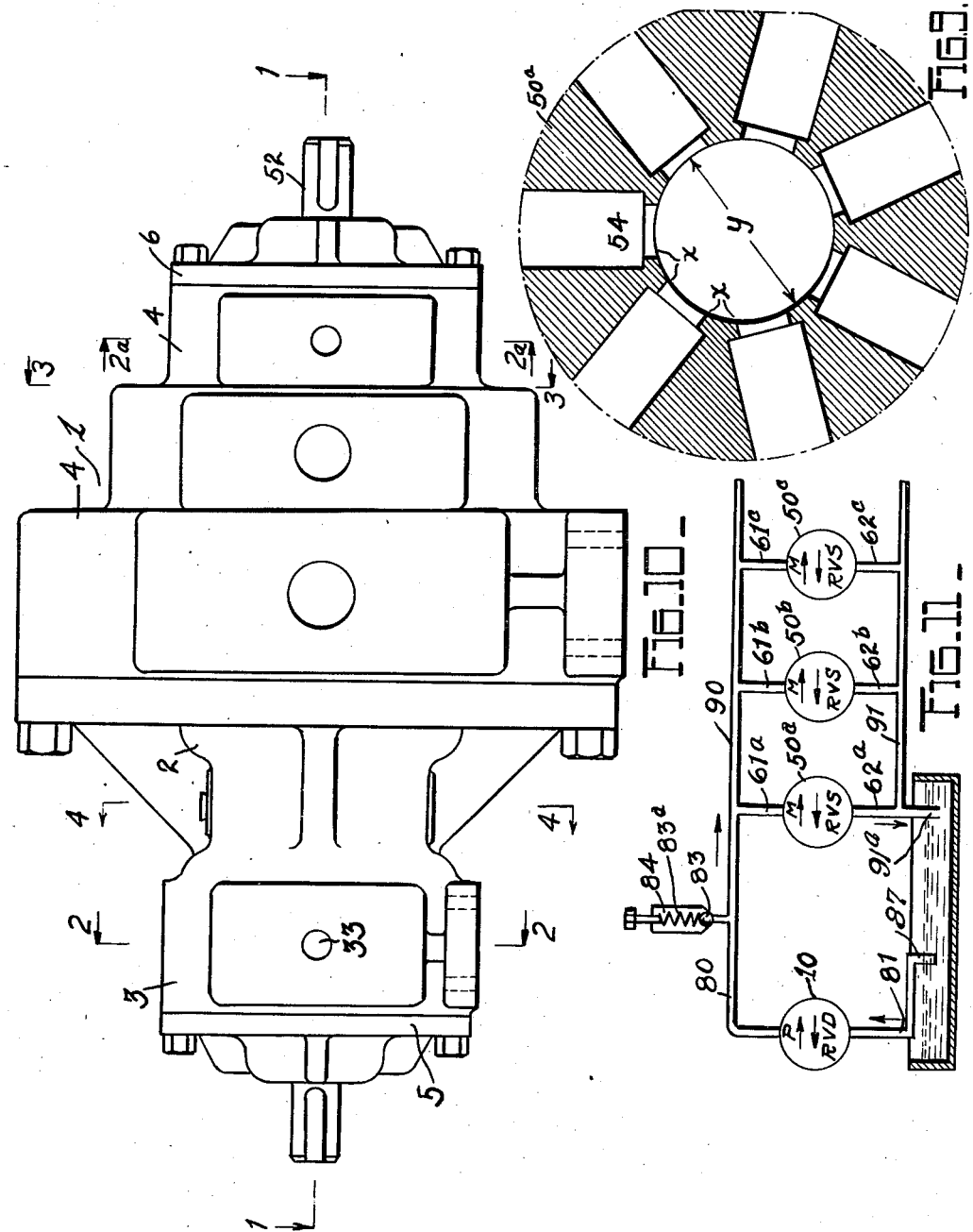

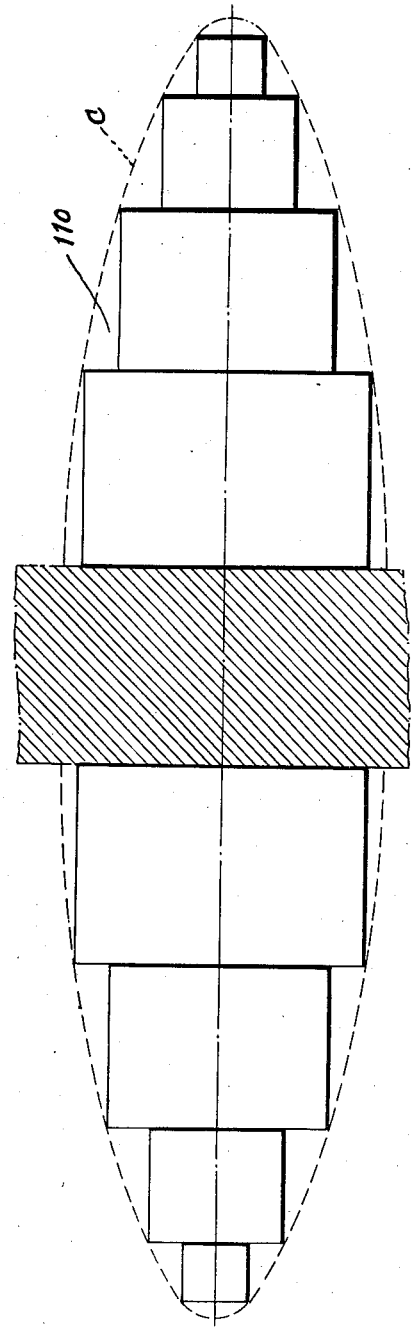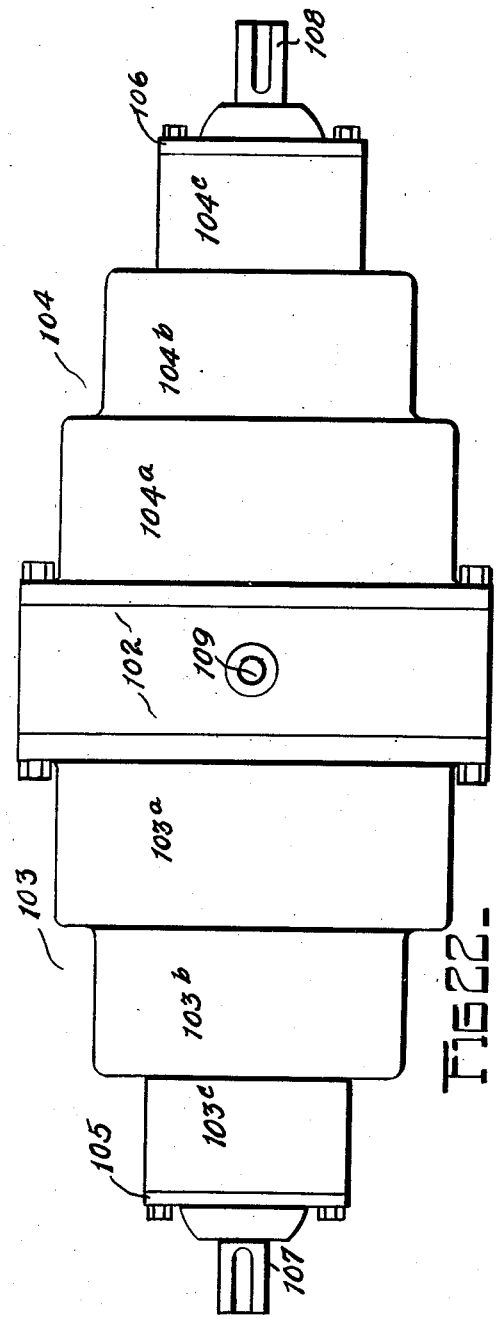

Patented June 20, 1939

2,163,079

UNITED STATES PATENT OFFICE 2,163,079

HYDRAULIC TRANSMISSION

Elek K. Benedek, Bucyrus, Ohio

Application May 18, 1935, Serial No. 22,259

18 Claims. (Cl. 60—53)

This invention relates to improvements in hydraulic transmissions. Heretofore, in transmissions of this character, wide variation in torque and speed has been obtained only at a sacrifice of efficiency and by means of structures which are comparatively complicated and expensive and are large in proportion to the horsepower output.

The principal object of the present invention is to provide a transmission unit having a much wider range of speed and torque with higher efficiency throughout the range.

Another object of the present invention is to provide a multi-stage transmission in which the various stage units may be adjusted independently of each other so as to deliver maximum horsepower output at any speed or torque delivery throughout the entire range and by which the transition from one adjusted delivery to another can be effected smoothly.

A correlative object is to provide a multi-stage pump and a multi-stage motor in a combination in which the stage units of each may be controlled independently of the stage units of the other.

A more specific object is to provide a compact and simple transmission of this character in which the operating parts are readily accessible for replacement and repairs and are contained in a compact casing which forms part of the operating structure.

Another specific object is to provide an overrunning clutch connection between barrel portions of the respective stages of a pump or motor whereby, under certain conditions, each stage can be operated independently of the others.

Other objects and advantages will become apparent from the following specification wherein reference is made to the drawings in which Fig. 1 is a horizontal longitudinal sectional view of a transmission embodying the principles of the present invention and is taken on the line 1—1 in Fig. 10;

Fig. 2 is a cross sectional view taken on a plane indicated by the line 2—2 and 2a—2a respectively in Fig. 1;

Figs. 3 and 4 are sectional views taken on the planes indicated by the lines 3—3 and 4—4, respectively, of Fig. 1;

Fig. 5 is a fragmentary bottom plan view of the fluid outlets of Fig. 4;

Fig. 6 is a fragmentary sectional view illustrating an overrunning clutch connection between two adjacent stage units;

Fig. 7 is a sectional view taken on a plane indicated by the line 7—7 in Fig. 6;

Fig. 8 is an enlarged fragmentary sectional view of the structure of Fig. 7; showing a slight modification thereof;

Fig. 9 is a fragmentary sectional view of a motor barrel, illustrating certain relations between the cylinders, cylinder ports and valve bore, and is taken on a plane indicated by the line 9—9 in Fig. 1;

Fig. 10 is a side elevation of the transmission unit illustrated in Fig. 1;

Fig. 11 is a diagrammatic illustration of the fluid circuit of the transmission illustrated in Fig. 1;

Figs. 12 and 13 are respectively front and side elevations of the plunger and heads illustrated in Fig. 1;

Figs. 14 and 15 are respectively a front elevation, partly in section, and a side elevation, of a slightly modified plunger and plunger head arrangement, the sectional portion of Fig. 14 being taken on the line 14—14 of Fig. 15;

Fig. 16 is a plan view of the plunger head illustrated in Fig. 15;

Fig. 17 is a side elevation of the plunger proper of Figs. 14 and 15;

Fig. 21 is a side elevation of a pintle blank, illustrating the design characteristics of the pintle; and Fig. 22 is a top plan view of a slightly modified form of the transmission illustrated in Fig. 10 enclosed in its supporting casing.

Figure 1:
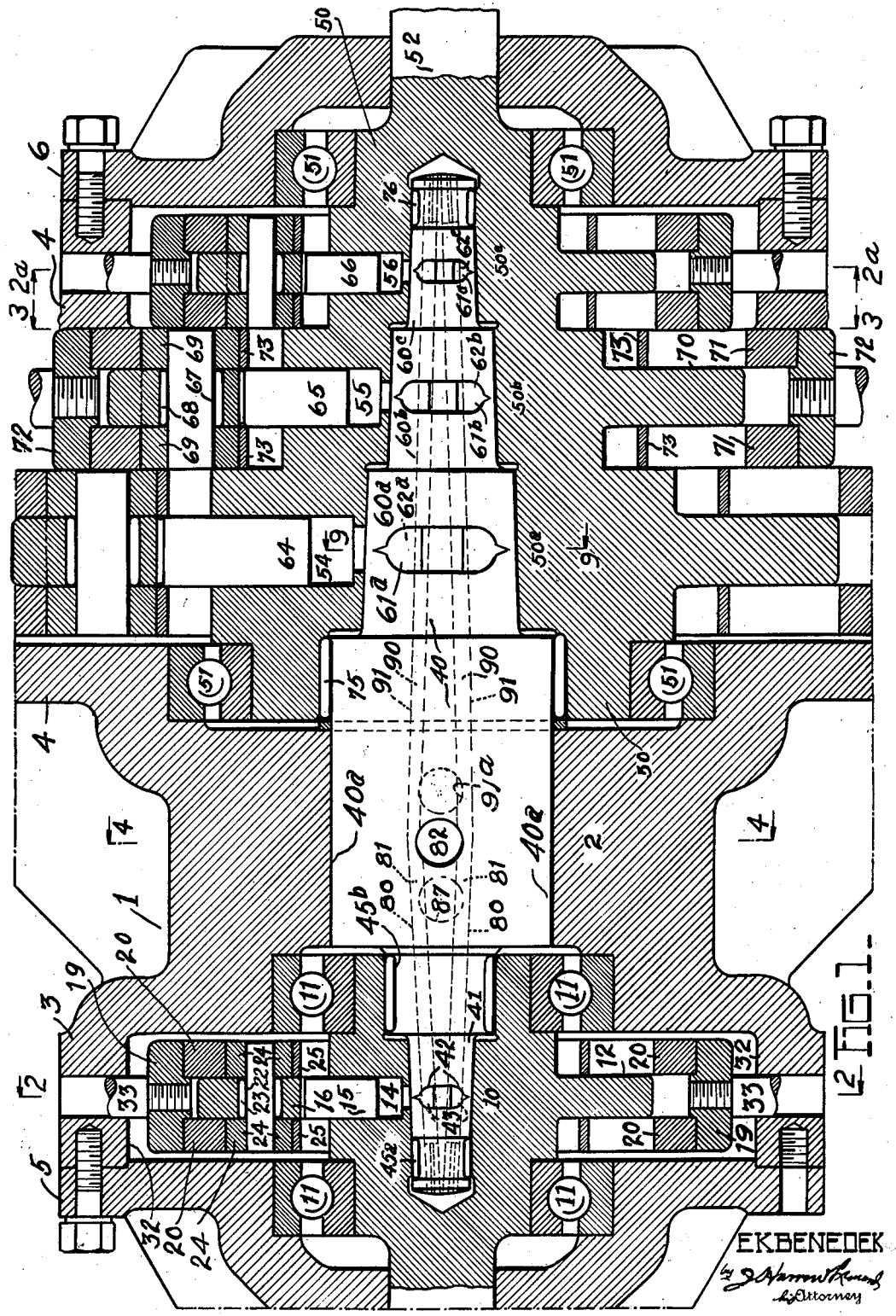
Figure 2:
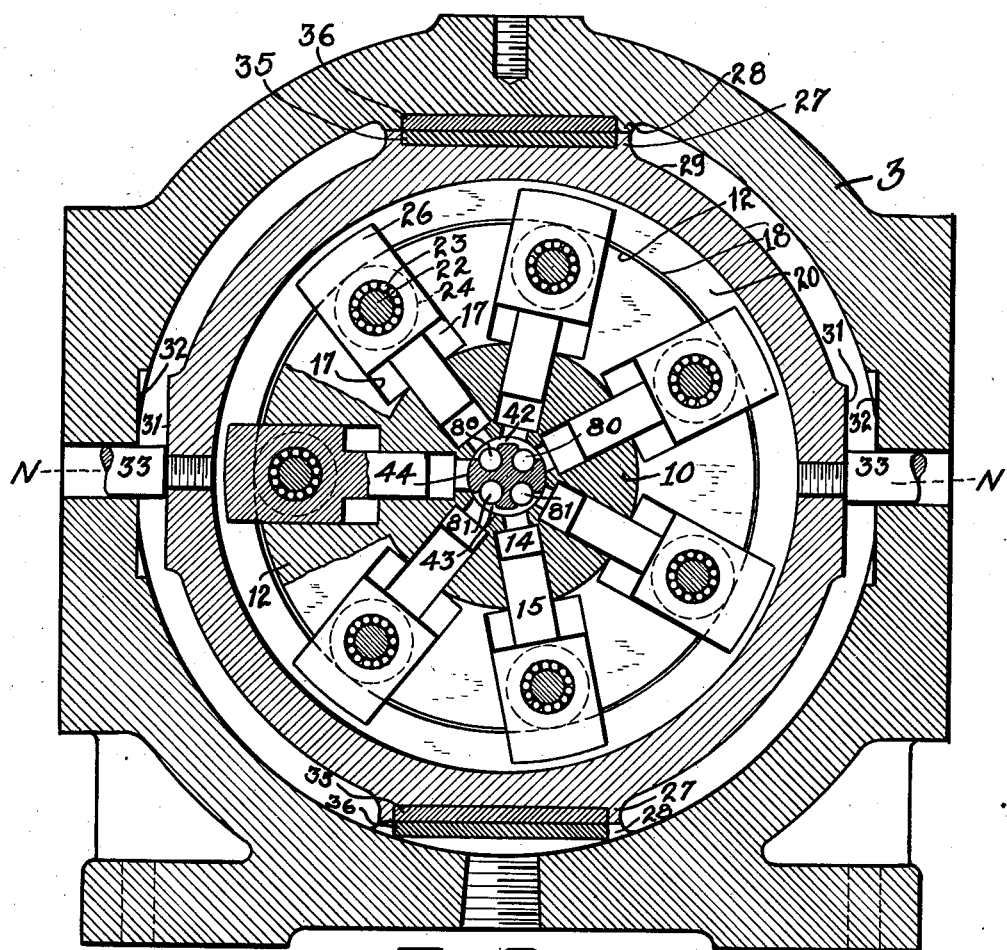
Figures 18, 19:
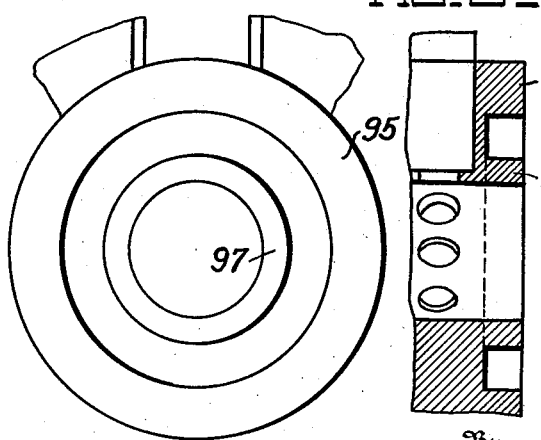
Figs. 18 and 19 are respectively a fragmentary end elevation and vertical section of the larger barrel portion illustrated in Fig. 6, showing the operating groove for the overrunning clutch and coupling.

Referring particularly to Figs. 1 to 4, inclusive and Fig. 10, the transmission is mounted in a rigid load supporting casing 1 comprising a central rigid wall portion 2 from which extends, at one end, a larger diameter annular flange portion 3 and, at the opposite end, a corresponding annular flange portion 4. The ends of the casing portions 3 and 4 are closed by bell-shaped end covers 5 and 6 respectively which are bolted to the portions 3 and 4 to provide therewith a rigid unitary structure in which all necessary axial bores and shoulders can be machined readily and will be in accurate alignment with each other when the casing is assembled.

Mounted for rotation within the casing portion 3 is a pump barrel 10, the barrel being supported at each end in anti-friction thrust bearings 11 operating in outer races accurately fitted in the cover 5 and the central wall 2 of the casing respectively for rigidly supporting the barrel for rotation about an axis extending parallel to the axis of the casing. The barrel is provided midway between the sets of bearings 11 with a radial flange 12 of proper diameter to terminate radially in inwardly spaced relation from the reactance means, later to be described, so that the reactance means may be removed axially from the end of the casing without being obstructed by the flange. The barrel is provided with a plurality of radial cylinders 14, in each of which is carried a radially reciprocable plunger 15, the plungers protruding radially of the barrel beyond the cylinder and, at their outer portions having enlarged heads 16. The heads 16 are reciprocable radially with the associated plungers and operate in radial guideways 17 formed in the flange 12 and consequently relieve the plungers from torque stresses.

Mounted within the portion 3 of the casing is a stationary reactance means, designated generally as 18, and comprising an annular reactance housing ring 19 in which are squeeze-fitted parallel, coaxial reactance rings 20, the rings 20 cooperating with the plungers for actuating the plungers on the pressure strokes consequent upon rotation of the barrel. The rings 20 are of hardened, wear resisting metal and are spaced apart axially for snugly receiving between their adjacent radial faces the outermost portions of the heads 16.

Inwardly from said portions, each head is provided with a pin receiving bore, extending parallel to the axis of the barrel. Within each bore is mounted a thrust pin 22, each pin 22 protruding parallel to the barrel axis beyond the head portion of the associated plunger. The pins 22 are mounted in the heads 16 on capillary cageless anti-friction needle rollers 23, so that the frictional resistance to rotation between the pin 22 and associated head 16 is less than the rolling friction imparted to the pin while concurrently adequate bearing contact area to withstand the hydraulic load is provided. On the protruding ends of each pin 22 are enlarged rollers 24 which are preferably squeeze fitted on the pin and form therewith a substantially unitary structure, the rollers 24 being in rolling engagement with the rings 20 for transmitting load between the plungers and the reactance rings 20.

In order to actuate the plungers on the suction stroke through the medium of the rollers 24 and to retain the rollers in operating position relative to the reactance rings 20, free floating rings 25 are provided, each ring underlying one set of rollers 24. Due to the fact that the pins 22 are so freely rotatable in the bores of the plungers, free rolling of the rollers 24 is assured so that none of them will tend to drag or slide on the rings 20 or 25 and create sliding friction between their surfaces and the respective rings.

Instead of the plungers above described, the plungers and heads of Figs. 14 to 17 may be used. In this modified structure, the plungers 15' and heads 24' are not connected together but the heads 24' merely abut the outer adjacent ends of the plungers with which associated, which ends are preferably spherical so that all load thrusts between the heads and associated plungers are directed along the axes of the plungers 15' and the plungers are relieved from all torque.

Aside from this difference the structure of Figs. 14 to 17 is the same as that of Figs. 12 and 13 and corresponding parts are equally designated by the same, but primed, numerals.

The reactance means 18 is mounted for movement to different adjusted positions in which it is disposed coaxially with or with its axis parallel to but offset from the axis of the barrel. For mounting the reactance means, the housing ring 19 is provided with diametrically opposite, wide flat slide surfaces 27, and complementary slide surfaces 28 are provided on the interior of the casing portion 3 so as to support the housing ring 19 for adjustment to different eccentric positions with respect to the barrel or into position concentric with the barrel. At 90° to the planes of the surfaces 27 and 28, complementary diametrically opposite limit abutment surfaces 31 and 32 are provided on the housing ring 19 and casing portion 3 respectively at opposite sides of the housing ring 19. Suitable adjusting rods 33, extending radially of the housing ring 19 and parallel to the abutment surfaces 27 and 28 are mounted in suitable bores in the casing portion 3 and are slidable axially of the casing bores for shifting the housing ring 19 to adjusted positions from the outside of the casing. The rods 33, in turn, may be operated by any suitable means such as the control set forth in my copending application, filed October 24, 1934, Serial No. 749,746, issued as Patent No. 2,111,659 on Mar. 22, 1938.

It is highly important that the reactance means be accurately maintained at all times in its adjusted positions. Since it is subjected to heavy loads and sliding friction on its slide surfaces in the casing portion 3, causing wear and resultant inaccuracy, the complementary slide surfaces of the housing ring 19 and casing portion 3 respectively carry hardened bearing shoes 35 and 36, these shoes being of cyanided or wear resistant material and being readily removable from the housing and casing for replacement. The importance of this feature will be apparent by reference to Figs. 2 and 20.

Figure 20:
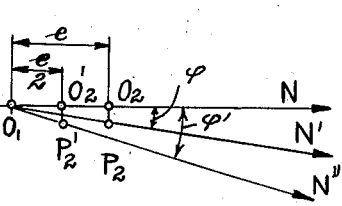
Fig. 20 is a diagrammatic illustration of the effect produced in the timing relation between the pintle ports and cylinders as a result of wear of the reactance supporting pads.

In Fig. 20, the maximum eccentricity $e$ of the reactance axis is shown as to the right of the barrel axis $O_1$. The reactance is adjustable along the normal line of adjustment N—N, so that it may be moved the distance $e$ to the right or to the left of $O_1$. Assuming, therefore, that $O_1$, in Fig. 20, is the rotational axis of the barrel and $O_2$ and $O_2'$ are exemplary adjusted positions of the axis of the housing ring 19 respectively, to maximum eccentricity $e$ and to one half maximum eccentricity $e/2$ it is evident that wearing or misalignment from any cause in the bearings 27 and 28 results in lowering of the axis of the reactance so that the axis of the reactance assumes the positions indicated by the positions $P_2$ and $P_2'$ instead of $O_2$ and $O_2'$. Obviously, this effects a downward swing of the normal dead center line of adjustment N—N through angles and respectively about the axis $O_1$ to positions N' and N''. Since the pintle ports, later to be described, are positioned in a fixed angular relation to the normal line N to effect proper timing relation with the cylinders in the barrel, this changed position of the reactance causes a different angular relation between the fixed pintle ports and reactance resulting in undesirable accelerated or delayed compression and expansion of fluid in the cylinders, evidenced by noise, vibration and undue wear.

Since in ordinary usage, the reactances of the motor in the transmission are shifted more often than that of the pump reactance and are subjected to greater wear, additional provision is made to overcome this wear by providing anti-friction cageless capillary needle rollers between the casing portion 4 and the motor reactances, as better illustrated in Fig. 3.

A valve pintle 40 is rigidly mounted through the medium of a shank portion 40a within the central wall portion 2 of the casing 1, and extends from the shank portion 40a axially in opposite directions. The left portion of the pintle has a valve portion 41 which snugly fits a dead end axial bore in the barrel 10, the pintle valve portion being provided with pressure and suction ports 42 and 43 respectively, each of the ports terminating circumferentially of the pintle in slight V-shaped notches, as illustrated, at the ends of the bridge portions 44. Each of the cylinders 14, in turn, opens into the barrel bore in position for valving cooperation successively with the ports 42 and 43 consequent upon rotation of the barrel, the passages between the cylinders and barrel bore preferably being restricted so as to provide greater circumferential clearance between adjacent passages.

In order to maintain the pintle in accurately centered position within the barrel bore and to provide for hydrostatic balance thereof, in the manner set forth in my copending application Ser. No. 754,753, filed November 26, 1934, issued as Patent No. 2,126,722 on Aug. 16, 1938, capillary cageless needle rollers 45a and 45b are provided between the pintle and the bore of the barrel 10 at each end of the valve portion 41 of the pintle. Also, as more fully described in my copending application last referred to, the barrel is preferably counterbored adjacent the shank of the pintle and the pintle is provided with a larger diameter portion disposed therein and cooperating with the walls of the counterbore of the barrel through the medium of the capillary bearings 45b. The pintle pressure ducts, later to be described, which extend longitudinally of the pintle, may be left open at the end of the pintle so as to discharge into the dead end of the barrel bore for supplying fluid for hydrostatic balance.

Referring next to the motor of the transmission and the various stage units thereof, the motor comprises a barrel, designated generally as 50, which barrel is rotatably mounted near its ends in suitable anti-friction thrust bearings 51 within the casing portion 4 and end cover 6 respectively. The barrel has a larger diameter portion 50a near the central wall portion 2 of the casing which portion extends axially part way of the length of the barrel and terminates in a reduced diameter portion 50b, the portion 50b, in turn, extending axially of the barrel and terminating in an additionally reduced diameter portion 50c. In the form illustrated in Fig. 1, all of these portions are integral, the last portion 50c being provided with the coaxial torque transmitting shaft 52 of the barrel. Thus the diameter of the barrel is successively reduced for each portion from the end adjacent the wall portion 2 of the casing to the end of the barrel adjacent the shaft 52.

Each of these portions of the barrel 50 comprises a different stage unit of the motor. The units are provided with series of radial cylinders 54, 55 and 56 respectively. Likewise the barrel 50 is provided with an axial bore for receiving the corresponding portion of the valve pintle, the diameter of the axial bore being greater in the unit 50a, of less diameter in the unit 50b, and of still less diameter in the unit 50c of the barrel. The walls of all the bore portions are preferably tapered slightly toward the shaft end of the barrel. Likewise the cylinders 54 are the largest cylinders of the motor, the cylinders 55 being smaller and the cylinders 56 being correspondingly smaller. Each of the cylinders of each unit communicates through suitable openings with the bore portion of the unit in which carried for valving cooperation with the ports of the pintle.

Extending from the shank portion 40a of the pintle are valve portions 60a, 60b and 60c respectively, each being smaller than the preceding in the order enumerated, these sections of the pintle fitting the corresponding bores of the units 50a, 50b and 50c. The portions of the pintle are provided with high pressure ports 61a, 61b and 61c respectively and low pressure ports 62a, 62b and 62c respectively, corresponding to the stage units, for cooperation successively with the cylinders of the stage units with which associated for driving the barrel.

In the cylinders of the stage units are radially reciprocable plungers 64, 65 and 66 respectively. Since all of the plungers are the same in function, differing only in size, the plungers 65 of the stage unit 50b only will be referred to in detail. The plungers 65 are provided with head portions having bores parallel to the barrel axis in which are received crosspins 67. Each crosspin is anti-frictionally mounted in its plunger head bore on capillary cageless needle rollers 68 and provided at its ends with rollers 69. The plunger heads operate in suitable radial guideways in the flange 70 of the portion of the barrel with which associated, the flange 70, in turn, being of less diameter than the load transmitting reactances so that the reactances can be removed axially without disturbing the barrel mounting. The plungers 65 cooperate through the medium of rollers 69 with axially spaced coaxial reactance rings 71 arranged in a manner similar to and cooperating with the rollers in the same manner as the reactance rings 20 of the pump.

The rings 71 are mounted in a reaction housing 72 which conforms in every way to the reactance housing 19 of the pump except that it is mounted on anti-friction rollers, as better illustrated in Fig. 3. Similarly floating rings 73, comparable to the rings 25 of the pump are provided, it being noted, however, that the rings 73 in the motor portion do not operate the plungers on the low pressure stroke, as this is unnecessary, but merely serve to retain the assemblies in proper operating positions. If desired, the rings 73 and 25 may be split rings, having the usual V-split, as they will be prevented from opening at the split by the plunger actuating rollers and are not subject to excessive stresses. Liberal clearance is allowed between the rings and plunger rollers to assure free floating action of the rings. The reactance housings of the other stage units are correspondingly mounted on anti-friction rollers, thus reducing wear and consequent improper synchronization between the pintle ports and respective cylinders and are different in diameter to correspond to the difference in diameter of the units. It will be noted that the reactance of the motor plungers of each unit is disposed in end to end, substantially abutting relation to the reactance and piston operating assemblies of adjacent stage units, and without any intervening supports and with minimum operating clearance so that the axial dimension of the transmission can be reduced as greatly as possible. The reactance rings of the sets of plungers 64, 65 and 66 are independent from each other and are mounted in independent housings, each of which can be adjusted entirely independently of the others.

The pintle received in the motor barrel bore is likewise mounted at its ends in capillary cageless needle rollers 75 and 76 respectively so as to permit balance of the hydrostatic load on the pintle, as described in my Patent No. 2,126,722, heretofore referred to in connection with the pump pintle.

Referring next to the hydraulic circuit utilized in the present structure, the pressure port 42 of the pump pintle is connected to longitudinally extending ducts 80 in the pintle, while the suction port 43 of the pump pintle is connected to ducts 81 in the pintle. The ducts 80, in turn, communicate with a relief duct 82 provided in the pintle shank 40a. Correspondingly, in the motor end of the pintle are ducts 90 which communicate with the high pressure ports 61a, 61b and 61c, and ducts 91 which communicate with the low pressure ports 62a, 62b and 62c of the pintle. The ducts 90, in turn, communicate directly with the ducts 80. The ducts 91 communicate with the ducts 81 in a manner to be described, or directly if desired. Thus the pressure port of the pump is connected to the high pressure port of the rotor and the high pressure motor ports of the rotor are connected in parallel with respect to each other. Correspondingly, the suction port 43 of the pump and the low pressure ports 62a, 62b and 62c of the motor are connected in parallel with each other.

In order to relieve the pressure in case it becomes excessive, the duct 82 is closed by a high pressure relief valve 83 mounted in a suitable bore 84 in the wall portion 2 of the transmission casing and seated by a spring 83a. Suitable drain ducts 85 and 86 communicate with the duct 82 beyond the valve 83 so that any fluid discharged by virtue of excessive pressure past the valve 83 will be discharged into the interior of the casing portions 3 and 4.

The ducts 81 communicate with a duct 87 in the wall portion 2 of the casing which, in turn, communicates with a suitable sump, and the low pressure ducts 91 communicate with a duct 91a which, in turn, communicates with the same sump. Consequently, an opportunity is afforded to cool the fluid when desired. This relation of the ducts of the pump and motor are better illustrated in Fig. 11, wherein all of the motor stage units are shown connected in parallel with each other and with the pump and a relief valve.

As more fully set forth in my copending application, Serial No. 7,809, filed February 23, 1935, entitled "Multi-stage hydraulic pump or motor", and especially with reference to Fig. 8 thereof, greater efficiency can be obtained by the utilization of a small pump at high speed than with a larger pump of the same volumetric fluid delivery at lower speed. Again, higher efficiency can be obtained by the use of a motor operating at full stroke than with a larger motor operating at short stroke but at the same fluid capacity.

Furthermore, the efficiency of both hydraulic motors and pumps decreases rapidly as the low eccentricity is approached. As stated, a pump or motor operating at a given volume at maximum eccentricity is more efficient than a large pump or motor operating at less eccentricity but at the same volumetric capacity. Assuming, therefore, that a high speed is required and the pump is operating at full capacity, the stage of the motor unit 50c can be operated. If a less speed is required, unit 50b can be operated, in addition thereto, and if a further speed reduction is desired portion 50a may be operated in addition. Again, if a given speed is to be used for a considerable period, all units of the motor, other than a particular one operating, can be set to zero eccentricity. For example, if the large unit at full capacity provides the torque required, it may be used alone and operate at its greatest efficiency and volume, and slowed down by adding the other units. Thus, at all times, the unit or units can be operated at nearest their full efficiency and only the excess over such capacity or speed required is utilized at the lower efficiency because of a unit operating at less than full stroke. Thus the fluid discharged from the high delivery pump would not be by-passed and wasted but would be utilized in one unit to its maximum efficiency and the excess only used at lower eccentricity and efficiency in another unit. Again, small units maintain their higher efficiency much nearer the minimum eccentricity. Instead of one unit utilizing 80% of capacity of the pump and operating at its full capacity, and one using the 20% excess and operating at a slight portion of its capacity, the two units might be operated at 50% capacity or stroke, at which the efficiency of neither has been too greatly reduced, especially when they are the smaller units of the transmission.

It is apparent that an infinite number of combinations can be obtained when the units are of different sizes, so that each unit of the motor may operate at the greatest eccentricity commensurate with the volumetric capacity which must be carried and the speed at which the motor is to operate. Such a combination has not been obtained heretofore and a sacrifice in efficiency has been necessary for wide range of speed and torque. The pump likewise is of variable delivery and consequently further adjustment can be effected for given speed and torque combinations while operating within an efficient range.

In some instances it is desirable to mechanically connect the stage units of the motor so that when one is idle it can be completely disconnected from the other and not merely rotated therewith at zero eccentricity. In such instances an overrunning clutch may be provided between the stage units.

As exemplary of such connection, an overrunning clutch is shown in Fig. 6 between the smallest stage unit of the motor and the next adjacent stage unit, these units corresponding to the units 50c and 50b, respectively, of Fig. 1 and being designated 96 and 95. The larger unit 95 is provided at one end with a hub portion 97 having an annular groove which receives an annular hub portion 98 on the unit 96, for rotatably supporting the adjacent ends of the units with respect to each other. The annular hub 98 of the unit 96 is provided with a series of circumferentially extending radially opening notches 99, each of which is of gradually increasing depth radially in a direction away from the direction of rotation of the unit 96, and deeper than the diameter of the rollers at the deeper end. Suitable rollers 100 are disposed in the notches 99 and extend parallel to the axis of the units. Consequently, when the unit 96 is rotating at greater speed than the unit 95, the rollers 100 are disposed in the deeper, or trailing, portion of the notches 99 and therefore the units are disconnected from driving relation and unit 96 rotates freely with respect to unit 95. If, however, more power is required or the eccentricity of one of the units and its reactance are varied and the unit 95 increases in speed, the rollers 100 are rolled toward the leading or shallow end of the notches 99 so as to effect a driving connection between the units 95 and 96. Such an overrunning clutch connection may be provided between two or more of the units of the motor, as each portion of the pintle, due to its step-down construction, is sufficiently rigid to withstand and support the associated unit even though the unit is not supported at the ends directly in the casing. In Fig. 8, a lug 95a is shown as provided in the notches 99 for preventing the rollers 100 from wedging too tightly in the shallow ends of the notches.

Referring next to Fig. 22, there is illustrated a transmission such as above described, with the exception that the pump is likewise multi-stage, each unit of the pump being a different size. Both pump and motor units are contained in a simple and compact casing comprising a central portion 102 corresponding to the portion 2 in Fig. 1. At each end of the central portion 102 are end portions 103 and 104 respectively, which are stepped down successively to conform to the different sizes of the pintle portions and cooperating units. Thus the casing portion 103, adjacent the central portion 102, accommodates a larger diameter pump, this portion being designated 103a. The next portion 103b accommodates a smaller diameter pump and the third portion 103c accommodates the smallest diameter pump, corresponding to a pump such as illustrated in Fig. 1. The pump units conform in structure to the motor units illustrated in Fig. 1, as also do the motor units. For example, the portions 50a, 50b and 50c of the barrel in Fig. 1 are accommodated respectively in portions 104a, 104b and 104c of the casing. The end portions 103 and 104 are closed at their opposite ends by suitable end plates 105 and 106 corresponding to the plates 5 and 6 in Fig. 1, a driving shaft 107 and a driven shaft 108 being provided for transmitting power. A suitable port 109 is provided in the casing portion 102 for connection to a sump for replacing slip fluid, or the connection illustrated in Figs. 1 and 11 may be used.

In Fig. 21 a blank pintle 110 illustrates the pintle design. It is seen that the pintle conforms as near as may be to a parabola C, which parabola is a function of the load, in proportion to the sectional moment of inertia of the pintle at the point of load application and section modulus so that the resultant pintle conforms as near as may be to a constant strength beam.

In connection with the pintle, it will be noted that there are several conjoint problems to be solved. There is a very fixed relation between the number of plunger cylinders that may be provided and the diameter of the associated pintle. Referring to Fig. 9, for example, the larger the diameter or number of cylinders for a given valve bore, the less circumferential clearance is provided at the points X, between the cylinders. At the same time, wider space is required between the pintle ports for larger cylinders. Consequently, if a larger cylinder with larger required clearance is provided, this can be obtained only by increasing the diameter of the bore Y. But an increase in Y must be added to the radius of all parts and necessitates increased circumferential speeds on the pintle and elsewhere, and increases pintle friction. The degree of deflection of the pintle under loads varies in a higher power ratio to the distance from the support to the point of load application. By forming the pintle in the step-down relation shown, each portion can be made to withstand the entire load of the associated unit without appreciable deflection. But, as pointed out, different sizes of stage units provide greater efficiency throughout a wider range of operation. All of these and other factors are provided for in the structure above described, with the result that highly efficient and durable wide range transmission is effected.

As above described, it is desirable to reduce friction between the reactance and the piston actuating means to as low a degree as is possible. The cost of manufacture of and the speeds to be withstood by rotary reactances, if they are to compete with gear transmissions, introduces many problems, especially in high pressure transmissions in which the rotary reactance must withstand such terrific stresses and loads that it is impractical to support it on other than direct thrust anti-friction bearings aligned radially with the load to be received.

A great reduction in diameter can be effected by utilizing stationary reactances. However, with a stationary reactance the thrust members of the plungers must necessarily roll at a comparatively high speed, and rolling engagement between the thrust means and the stationary reactance is absolutely necessary. Due to the reduced diameter of the reactance, necessarily some reduction in speed of the rotation of the crosspins can be effected and if this diameter can be sufficiently reduced, provision can be made for withstanding the resultant speed of rotation of the thrust pins about their own axes. This also is accomplished to a considerable degree by the structure above described.

The multi-stage pump or motor structure herein disclosed is claimed as a pump or motor structure per se in my copending application Serial No. 31,651, filed July 16, 1935 and entitled "Multi-stage pump or motor", the subject matter herein claimed being to the pump and multi-stage motor relation providing the transmission mechanism.

Having thus described my invention, I claim:

1. In a hydraulic device, a rotary pump, a plurality of motor stage units, each unit comprising a barrel having a set of radial cylinders, plunger assemblies reciprocable therein, independent reactance means for the assemblies, valve means for the units, means operatively fluid connecting all the units in parallel and with the pump, clutch means operatively interposed between the barrels of adjacent units for mechanically connecting one barrel to the other for driving together in one direction of rotation consequent upon a predetermined rotational speed of one barrel with respect to the other, and for disconnecting the said barrels consequent upon a reduction in the speed of one of said barrels relative to the other.

2. In a hydraulic device, a pump, a plurality of motor stage units, each unit comprising a rotatable barrel having a set of radial cylinders, plunger assemblies reciprocable therein, individually adjustable reactance means for the assemblies respectively, and valve pintle means for the units and having means operatively fluid connecting the units and pump, and an overrunning clutch operatively interposed between the barrels of adjacent units for mechanically drivingly connecting one to the other in one direction of rotation consequent upon a predetermined rotational speed of said adjacent barrels with respect to each other and for drivingly disconnecting the barrels of said adjacent units consequent upon a reduction in the speed of one of said barrels relative to the other for permitting free rotation of one barrel relative to the other barrel.

3. In a hydraulic transmission, a pump comprising a rotatable barrel, radial piston and cylinder assemblies carried thereby, reactance means for the assemblies, a motor comprising a barrel having a plurality of different diameter portions arranged in the order of size from one end to the other, each barrel portion having a circumferential series of radial cylinders and plunger assemblies reciprocable in the cylinders respectively, and each barrel portion with its associated cylinders and plunger assemblies providing a motor stage unit of different fluid capacity, individually adjustable reactances for the units respectively, the said barrel portions having a common axial valve bore, and the cylinders of each barrel portion opening into the valve bore, means mounting said barrel for rotation about the bore axis, a valve pintle for said barrel, said pintle fitting the said barrel bore, said pintle being fixedly supported at the end adjacent the largest unit, inlet and outlet valve ports in the pintle for valving cooperation respectively with the cylinders of the corresponding units said pintle having a coaxial portion hydraulically fitting the pump barrel and having ports in valving cooperation with the piston and cylinder assemblies of the pump, duct means internally of the pintle connecting the pump to said pintle ports of the motor in parallel with each other and with the valve ports of the pump portion of the pintle in an internal pressure fluid circuit.

4. In a hydraulic transmission, a casing comprising a rigid weight supporting wall, a valve pintle fixedly supported therein and protruding axially in each direction therefrom, said pintle having a plurality of different diameter portions on each protruding portion beginning with the largest portion adjacent the said wall, and each succeeding portion in the direction toward the end of the pintle being less in diameter than the preceding portion, a plurality of different fluid capacity rotary radial plunger pump units and a plurality of different capacity rotary radial plunger motor units, said units having coaxial bores fitting about said pintle for valving cooperation therewith, and arranged relative to the pintle for cooperation each with the pintle portion corresponding in size to the capacity of the particular unit, pressure duct means in the pintle operatively connecting all of the pumping units in parallel and with all of the motor units concurrently, discharge duct means in the pintle for said units, an impeller shaft on the pump coaxial with and extending from the outermost end pump unit, and a torque transmission shaft carried on the motor coaxial therewith and extending from the outermost end motor unit.

5. In a hydraulic transmission, a casing comprising a rigid weight supporting wall, a valve pintle fixedly supported therein and protruding axially in each direction therefrom, said pintle having a plurality of different diameter portions on each protruding portion beginning with the largest portion adjacent the said wall, and each succeeding portion in the direction toward the end of the pintle being less in diameter than said large portion, a plurality of different capacity and size rotary radial plunger pump units at one side of said wall and a plurality of different capacity and size rotary radial plunger motor units at the other side of said wall, all of said units having axial bores fitting about said pintle and said units being arranged relative to the pintle for cooperation respectively with the pintle portion corresponding in size to the capacity of the particular unit, pressure duct means in the pintle operatively connecting all of the pumping units with all of the motor units, discharge duct means in the pintle for said units, an impeller shaft carried on the outermost end unit of the pump coaxial therewith, a torque transmission shaft carried on the outermost end unit of the motor, and the pintle terminating at its ends in spaced relation to the outer ends of the outermost end units of the pump and the motor and being supported only at its central portion.

6. In a hydraulic transmission, an independently rotatable rotary pump mechanism, a rotary fluid motor mechanism, one of said mechanisms comprising a plurality of independently adjustable units, said units being of different size and different fluid capacity with respect to each other, the other of said mechanisms comprising at least one unit, a valve member in valving cooperation with and common to all of said units and hydrostatically balanced with respect to each unit, means for adjusting each of said plurality of units individually, and said valve member having means for connecting all of the units in parallel with each other in an internal pressure fluid circuit.

7. In a hydraulic transmission, a rotary pump mechanism, a rotary hydraulic motor mechanism, one of said mechanisms having more than two coaxial independently adjustable stage units of different size and capacity from each other, the other mechanism having at least one stage unit, means in valving cooperation with all of the units concurrently and connecting all of the units in parallel in an internal pressure fluid circuit.

8. In a hydraulic transmission, a rotary pump mechanism, a rotary fluid motor mechanism, one of said mechanisms comprising a plurality of independently adjustable units of different size and capacity from each other, the other of said mechanisms comprising at least one unit, a valve member in valving cooperation with and common to all of said units and hydrostatically balanced with respect to each unit, means for adjusting each of said plurality of units individually, and said valve member having means for connecting all of the units in parallel with each other in an internal pressure fluid circuit, said valve member terminating endwise short of the outer ends of the mechanisms, and shafts on the ends of the mechanisms respectively coaxial with respect to the axis of rotation thereof.

9. The combination with an adjustable rotary fluid pump having an axial impeller shaft at one end and a multi-stage fluid motor coaxial with the pump and comprising a plurality of independently adjustable stage units of different size and capacity from each other and having a common driven shaft coaxial with the units and extending from one end of the motor, of a common valve pintle coaxial with the pump and motor and hydrostatically balanced with respect to the pump and to each of the motor units and in valving cooperation therewith, and means within the pintle connecting the pump and all motor units in parallel with each other in a pressure fluid circuit.

10. In a hydraulic transmission, a rotary pump mechanism, a rotary fluid motor mechanism, one of said mechanisms having a plurality of independently adjustable stage units of different size and capacity from each other and the other mechanism having at least one stage unit, means for adjusting each one of said plurality of units independently of the others, valve means for all of the units, and means connecting all of the units in a pressure fluid circuit.

11. In a hydraulic transmission, the combination of a pump; and a motor connected in hydraulic circuit therewith, said motor comprising a rotary barrel having a plurality of separate sets of cylinders, plungers carried by said cylinders and reciprocable therein, the cylinders of each set and their associated plungers constituting a motor unit, the fluid capacities of said motor units differing with respect to each other, reactance means operatively connected to the plungers of said units respectively, and cooperable with the associated plungers for effecting rotation of the barrel upon reciprocation of the plungers, means mounting said reactance means independently of each other and for individual adjustment eccentrically with respect to the axis of rotation of the barrel, and means for selectively and individually adjusting the reactance means of the respective units.

12. In a hydraulic apparatus, a motor including a fluid intake, a plurality of motor stage units, each unit comprising a barrel having a set of radial cylinders, plunger assemblies reciprocable therein, independent reactance means for the assemblies, valve means for the units, means operatively fluid connecting all the units in parallel and to the fluid intake, clutch means operatively interposed between the barrels of adjacent units for mechanically connecting one barrel to the other for driving together in one direction of rotation consequent upon a predetermined rotational speed of one barrel with respect to the other, and for disconnecting the said barrels consequent upon a predetermined rotational speed of one barrel with respect to the other, and for disconnecting the said barrels consequent upon a reduction in the speed of one of said barrels relative to the other.

13. In a hydraulic apparatus, a motor including a fluid intake, a plurality of motor stage units, each unit comprising a rotatable barrel having a set of radial cylinders, plunger assemblies reciprocable therein, individually adjustable reactance means for the assemblies respectively, and valve pintle means for the units and having means operatively fluid connecting the units and to the fluid intake, and an overrunning clutch operatively interposed between the barrels of adjacent units for mechanically drivingly connecting one to the other in one direction of rotation consequent upon a predetermined rotational speed of said adjacent barrels with respect to each other and for drivingly disconnecting the barrels of said adjacent units consequent upon a reduction in the speed of one of said barrels relative to the other for permitting free rotation of one barrel relative to the other barrel.

14. In a multi-stage hydraulic motor comprising a plurality of stage units, each unit comprising an independently rotatable barrel having a set of radial cylinders, plunger assemblies reciprocable therein respectively, reactance means for the assemblies, valve means for the cylinders, overrunning clutch connecting means interposed between adjacent barrels respectively and connecting each barrel to an adjacent barrel, and being operative to disconnect said barrels and permit greater rotational speeds of one barrel relative to the other.

15. In a hydraulic apparatus having a pressure fluid inlet, the combination of a rotary barrel having a plurality of separate sets of cylinders having valved communication with said inlet, plungers carried by said cylinders and reciprocable therein, the cylinders of each set and their associated plungers constituting a motor unit, the fluid capacities of said motor units differing with respect to each other, reactance means operatively connected to the plungers of said units respectively, and cooperable with the associated plungers for effecting rotation of the barrel upon reciprocation of the plungers, means mounting said reactance means independently of each other and for individual adjustment eccentrically with respect to the axis of rotation of the barrel, and means for selectively and individually adjusting the reactance means of the respective units.

16. In a hydraulic apparatus, a motor including a fluid intake, a plurality of stage units, each unit comprising a barrel having an axial bore and a plurality of circumferentially spaced radial cylinders opening into said bore, plunger assemblies reciprocable in the cylinders respectively, reactance means for the assemblies of each unit, means mounting said reactance means independently of each other and for individual adjustment eccentrically with respect to the axis of rotation of the associated barrel, and means for selectively and individually adjusting the reactance means of the respective units, said units being of different diameter from each other and arranged coaxially in a row with the largest unit at one end of the row and with the remaining units in succession in the order of their sizes, and in substantially abutting end to end relation with only operating clearance therebetween, and a casing comprising different diameter circumferential wall portions corresponding to and surrounding the units and having radial wall portions joining said circumferential wall portions and lying in closely spaced relation to the ends of the associated units, and a pressure fluid circuit connecting the units in parallel.

17. In a hydraulic apparatus, a motor including a fluid intake, a barrel having a plurality of different diameter portions arranged in the order to size from one end to the other, each barrel portion having a circumferential series of radial cylinders and plunger assemblies reciprocable in the cylinders respectively, and each barrel portion with its associated cylinders and plunger assemblies providing a stage unit of different fluid capacity, individually adjustable reactances from the units respectively, means for selectively and individually adjusting the reactance means of the respective units, the said barrel portions having a common axial valve bore of different diameter portions corresponding to the associated barrel portion, and the cylinders of each barrel portion opening into the corresponding bore portion, means mounting said barrel for rotation about the bore axis, a valve pintle for said barrel, said pintle having different diameter portions corresponding to and fitting the said barrel bore portions respectively, said pintle being fixedly supported at the end adjacent the largest unit, inlet and outlet valve ports in the pintle portions for valving cooperation respectively with the cylinders of the corresponding units, means internally of the pintle connecting said pintle ports, and a torque transmission shaft on and coaxial with the unit remote from the pintle mounting and extending axially therefrom.

18. In a hydraulic apparatus, a motor comprising a plurality of rotatable stage units, each unit comprising a barrel having an axial bore and a plurality of circumferentially spaced radial cylinders opening into said bore, plunger assemblies reciprocable in the cylinders respectively, individually adjustable reactance means for the plungers of each unit, means for selectively and individually adjusting the reactance means of the respective units, said units being arranged in a row axially and being coaxial with respect to each other, said units being different diameters and having different fluid capacities respectively corresponding to the respective diameter, said units being arranged with the largest unit at one end of the row and with the remaining units in the order of their size, said units having valve bores proportionate in diameter to their respective sizes, a fixedly mounted valve pintle common to said units, said pintle having portions of different diameters with respect to each other corresponding to and in valving cooperation with the bores and cylinders of the units respectively, and duct means in the pintle for operatively fluid connecting the cylinders of the stage units in parallel with each other.

ELEK K. BENEDEK.